United States Patent
Fujisaki et al.

(10) Patent No.: US 9,733,690 B2
(45) Date of Patent: Aug. 15, 2017

(54) COMMUNICATION DEVICE WHICH DECREASES POWER COMSUMPTION BY POWERING OFF UNUSED FUNCTIONS WHEN DEVICE IS INACTIVE

(71) Applicant: KABUSHIKI KAISHA TOSHIBA, Minato-ku, Tokyo (JP)

(72) Inventors: Koichi Fujisaki, Kanagawa (JP); Tetsuro Kimura, Tokyo (JP); Tatsunori Kanai, Kanagawa (JP); Junichi Segawa, Kanagawa (JP); Masaya Tarui, Kanagawa (JP); Satoshi Shirai, Kanagawa (JP); Hiroyoshi Haruki, Kanagawa (JP); Yusuke Shirota, Kanagawa (JP); Akihiro Shibata, Tokyo (JP); Shiyo Yoshimura, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 43 days.

(21) Appl. No.: 14/639,201

(22) Filed: Mar. 5, 2015

(65) Prior Publication Data
US 2015/0261283 A1 Sep. 17, 2015

(30) Foreign Application Priority Data
Mar. 13, 2014 (JP) .................................. 2014-050223

(51) Int. Cl.
*G06F 1/32* (2006.01)
(52) U.S. Cl.
CPC .......... *G06F 1/3234* (2013.01); *G06F 1/3206* (2013.01); *G06F 1/3287* (2013.01);
(Continued)

(58) Field of Classification Search
CPC ............................. G06F 1/3234; G06F 1/3287
See application file for complete search history.

(56) References Cited

U.S. PATENT DOCUMENTS 5,355,503 A * 10/1994 Soffel ................... G06F 1/3215
713/321
5,903,746 A * 5/1999 Swoboda .................. G06F 1/08
713/501
(Continued)

FOREIGN PATENT DOCUMENTS

| JP | 2000-181584 | 6/2000 |
| TW | 200415884 | 8/2004 |
| TW | 201214101 | 4/2012 |

OTHER PUBLICATIONS

Office Action for Taiwanese Patent Application No. 104108025 dated Jan. 21, 2016, 10 pages.

*Primary Examiner* — Jaweed A Abbaszadeh
*Assistant Examiner* — Cheri Harrington
(74) *Attorney, Agent, or Firm* — Amin, Turocy & Watson LLP (57) ABSTRACT

According to an embodiment, a communication device includes a register and a controller. The register receives data from an external device via an input data line. In a first state in which the communication device is able to receive the data, when a condition in which the data is not sent to the input data line continues for a certain period of time, the controller controls to switch state of the communication device to a second state in which power consumption is less than in the first state.

10 Claims, 5 Drawing Sheets

(52) U.S. Cl.
CPC ........ *G06F 1/3296* (2013.01); *Y02B 60/1228* (2013.01); *Y02B 60/1235* (2013.01)

(56) References Cited

U.S. PATENT DOCUMENTS

| | | | | |
|---|---|---|---|---|
| 6,047,342 A * | 4/2000 | Depew | ................. | G06F 1/3228 710/2 |
| 6,694,441 B1 * | 2/2004 | Sethia | .................... | G06F 1/3287 713/322 |
| 6,976,182 B1 * | 12/2005 | Filippo | ................. | G06F 9/3885 713/322 |
| 7,133,944 B2 | 11/2006 | Song et al. | | |
| 7,493,440 B2 | 2/2009 | Song et al. | | |
| 8,897,705 B2 | 11/2014 | Yen et al. | | |
| 2004/0117679 A1 * | 6/2004 | Kim | ...................... | G06F 1/3203 713/320 |
| 2004/0151149 A1 | 8/2004 | Song et al. | | |
| 2004/0162922 A1 * | 8/2004 | Kardach | ................. | G06F 1/3203 710/15 |
| 2004/0268170 A1 * | 12/2004 | Ayyavu | ................. | G06F 1/3203 713/323 |
| 2006/0020835 A1 * | 1/2006 | Samson | ................. | G06F 1/3225 713/300 |
| 2007/0016812 A1 | 1/2007 | Song et al. | | |
| 2007/0025195 A1 * | 2/2007 | Oh | ........................ | G06F 1/3221 369/30.03 |
| 2009/0204831 A1 * | 8/2009 | Cousson | ............... | G06F 1/3203 713/322 |
| 2011/0235459 A1 * | 9/2011 | Ware | ........................ | G11C 7/04 365/233.11 |
| 2012/0054511 A1 * | 3/2012 | Brinks | ....................... | G06F 1/26 713/310 |
| 2012/0083212 A1 | 4/2012 | Yen et al. | | |
| 2013/0326251 A1 * | 12/2013 | Adewale | ............... | G06F 1/3215 713/323 |
| 2014/0115365 A1 * | 4/2014 | Qin | .......................... | G06F 1/32 713/323 |
| 2014/0143574 A1 * | 5/2014 | Ma | ........................ | G06F 1/3234 713/323 |
| 2014/0149770 A1 * | 5/2014 | Ahmad | ................. | G06F 1/3228 713/323 |
| 2014/0351615 A1 * | 11/2014 | Gupta | ................ | H03K 19/0016 713/322 |
| 2016/0299860 A1 * | 10/2016 | Harriman | ................ | G06F 13/36 |

* cited by examiner

FIG.8

COMMUNICATION DEVICE WHICH DECREASES POWER COMSUMPTION BY POWERING OFF UNUSED FUNCTIONS WHEN DEVICE IS INACTIVE

CROSS-REFERENCE TO RELATED APPLICATION(S)

This application is based upon and claims the benefit of priority from Japanese Patent Application No. 2014-050223, filed on Mar. 13, 2014; the entire contents of which are incorporated herein by reference.

FIELD

Embodiments described herein relate generally to a communication device.

BACKGROUND

In order to reduce the power consumption of a device such as a processor that is installed in an electronic device, a technology is known in which power saving of the entire processor is achieved using a transistor having only a small amount of leakage current, or a technology is known in which power saving is achieved in small units (hardware blocks) called modules that are used in implementing specific functions in the processor.

The technology of reducing the power consumption on a module-by-module basis is called power gating and is implemented to stop the supply of electrical power to the modules. Thus, power gating is available only when the modules are not in use. On the other hand, as far as the technology for reducing the power consumption during the usage of modules is concerned, dynamic voltage and frequency scaling (DVFS) is known in which the voltage and the clock cycle during operations is varied in a dynamic manner. Besides, a technology called clock gating is also available as a conventional power saving technology in which the power consumption is reduced by stopping the clock signals. In an identical manner to power gating, clock gating is also implemented to reduce the power consumption of the modules corresponding to idle functions.

Regarding the effect of reducing power consumption of the modules, power gating is more effective. However, prior to enable power gating, data in volatile memory (e.g. SRAM or registers, etc.) is necessarily to be saved. When the concerned module is to be used, it is necessarily to restore the data which is save in memories before power gating or initialize the concerned module. Consequently, power gating is accompanied by overheads. In contrast, in the case of clock gating, it is only necessary to stop the clock signals. Hence, although clock gating is less effective than power gating as far as the reduction in power consumption is concerned, there are no overheads during clock gating because no information needs to be saved. Thus, while reducing the power consumption of modules, whether to enable power gating or to enable clock gating is decided by taking into account the respective merits and demerits.

Herein, power gating as well as clock gating can be implemented only when it is known in advance that the modules are not in operation. However, for example, in a state in which the processor is waiting for an input from outside, it is not known when the input would be received. Hence, it becomes necessary to continue with the supply of electrical power and clock signals.

In the past, the development of power saving technology, such as power gating or DVFS, was carried out keeping in mind single processors. However, for example, in the case in which a processor communicates with other devices, it is not possible to know when another device would send data. For that reason, regarding the functions (modules) related to data reception, it is imperative to continue with the supply of electrical power that is required to receive data from other devices.

DETAILED DESCRIPTION

According to an embodiment, a communication device includes a register and a controller. The register receives data from an external device via an input data line. In a first state in which the communication device is able to receive the data, when a condition in which the data is not sent to the input data line continues for a certain period of time, the controller controls to switch state of the communication device to a second state in which power consumption is less than in the first state.

An embodiment will be described below in detail with reference to the accompanying drawings.

Figure 1:
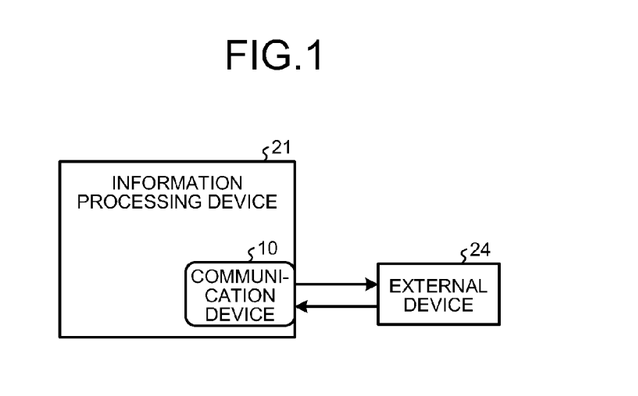
FIG. 1 is a diagram illustrating an exemplary overall configuration of an information processing device according to an embodiment.

FIG. 1 is a diagram illustrating an exemplary overall configuration of an information processing device 21 according to the embodiment. As illustrated in FIG. 1, the information processing device 21 includes a communication device 10 that communicates with an external device 24.

Figure 2:
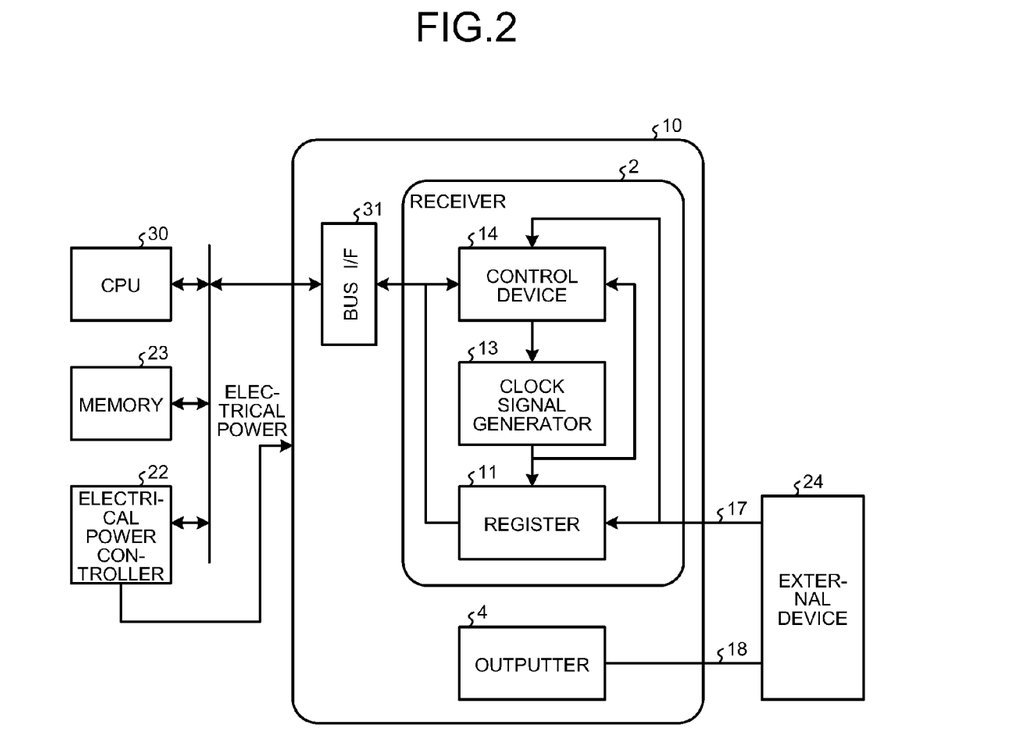
FIG. 2 is a diagram illustrating an exemplary configuration of the information processing device according to the embodiment.

FIG. 2 is a diagram illustrating an exemplary specific configuration of the information processing device 21. As illustrated in FIG. 2, the information processing device 21 includes a central processing unit (CPU) 30, a memory 23, an electrical power controller 22, and the communication device 10.

The CPU 30 executes computer programs stored in the memory 23, and controls the operations of the entire information processing device 21. The electrical power controller 22 controls the supply of electrical power to the constituent elements (such as the communication device 10) of the information processing device 21.

The communication device 10 communicates with the external device 24 such as a sensor. The external device 24 can be considered to be corresponding to an "external device" mentioned in claims. As illustrated in FIG. 2, the communication device 10 includes a receiver 2 that has the function of receiving data; a sender 4 that has the function of sending data; and a bus interface (in the following explanation, sometimes written as a BUS I/F) 31 that has the function of input and output of data for the communication device 10. The receiver 2 is connected to the external device 24 via an input data line 17. Similarly, the sender 4 is connected to the external device 24 via an output data line 18, and controls to output data to the output data line 18.

The receiver 2 includes a register 11 that is used in receiving data from the external device 24 via the input data line; a clock signal generator 13 that generates clock signals (synchronization signals); and a control device 14. In this example, the clock signal generator 13 can be considered to be corresponding to a "synchronization signal generator" mentioned in claims.

Figure 3:
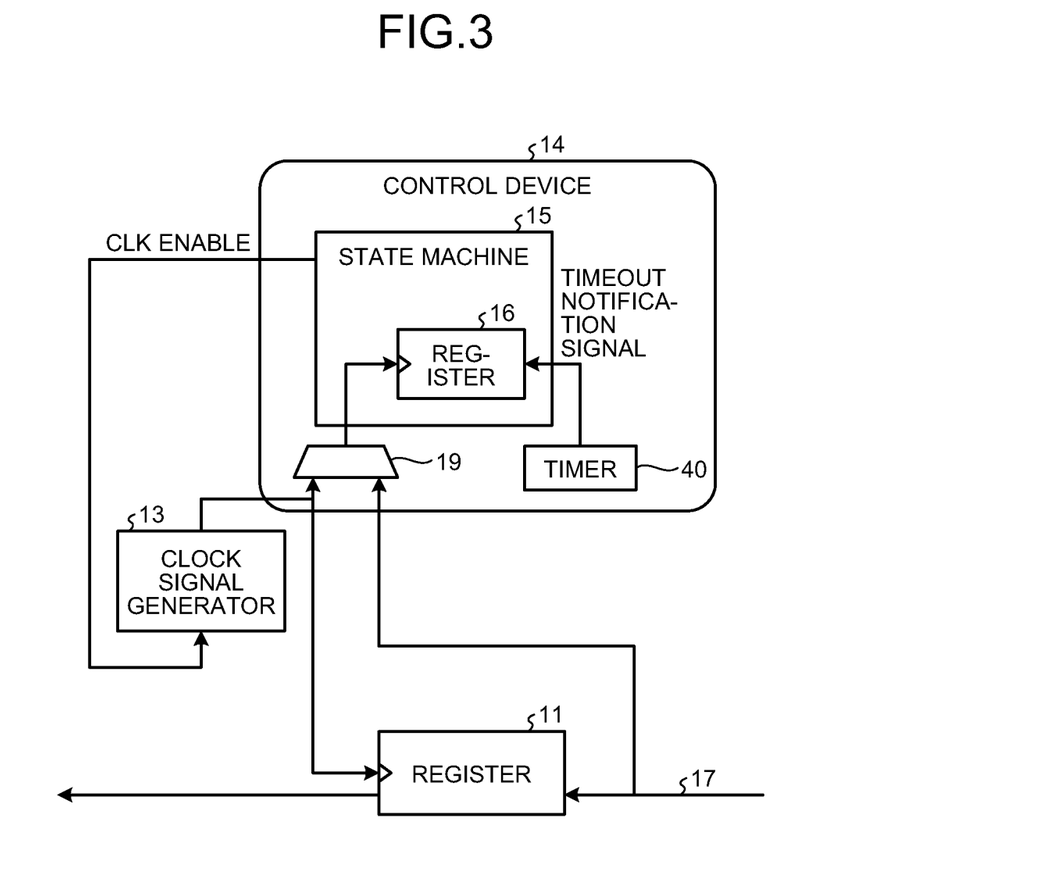
FIG. 3 is a diagram illustrating an exemplary configuration of a control device according to the embodiment.

FIG. 3 is a diagram illustrating an exemplary specific configuration of the control device 14. As illustrated in FIG. 3, the control device 14 includes a state machine 15, and includes a register 16, a selector 19, and a timer 40 that are used in controlling the state of the state machine 15.

In the embodiment, in a first state that indicates the state in which the communication device 10 is able to receive data, the timer 40 of the control device 14 (the state machine 15) starts measuring time from the timing at which the last piece of data was sent to the input data line 17. In the timer 40, a period of time is set for waiting for an input of data to the input data line 17 in the first state. If no data is received until the period of time set in the timer 40 gets over, then the timer 40 sends a signal notifying that data is not input (in other words, sends a signal notifying that, in the first state, the state in which no data is sent to the input data line 17 continued for a certain period of time; hereinafter, called a "timeout notification signal") to the control device 14. Upon receiving the timeout notification signal, the control device 14 controls to switch the state of the communication device 10 to a second state in which power consumption is less than in the first state.

Thus, in the embodiment, in the first state, when the condition that data is not sent to the input data line 17 continues for a certain period of time, the control device 14 controls to switch the state of the communication device 10 to the second state. More particularly, based on the measurement result of the timer 40 that is used in measuring the period of time for which data is not sent to the input data line 17 in the first state; when the condition that data is not sent to the input data line 17 continues for a certain period of time, the control device 14 controls to switch the state of the communication device 10 to the second state. More particularly, the explanation is as follows. In this example, the control device 14 can be considered to be corresponding to a "controller" mentioned in claims. Alternatively, the state machine 15 can also be considered to be corresponding to a "controller" mentioned in claims.

Meanwhile, in the embodiment, the selector 19 either selects the signal sent to the input data line 17 or selects a clock signal, which is used in determining the operation timing of the control device 14 (can also be considered to be the operation timing of the state machine 15); and sends the selected signal to the register 16. In this example, the register 16 can be considered to be a "control memory device" mentioned in claims. In the example illustrated in FIG. 3, the input side of the selector 19 is connected with an output line to which a clock signal generated by the clock signal generator 13 is sent, and is connected with the input data line 17. According to a switching signal sent from the state machine 15, the selector 19 selects either the input from the output line or the input from the input data line 17, and sends the selected input to the register 16.

Herein, in the first state in which the communication device 10 is able to receive data from the external device 24, the electrical power controller 22 controls to supply electrical power to at least the receiver 2 (the register 11, the clock signal generator 13, and the control device 14) and the BUS I/F 31 from among a plurality of constituent elements of the communication device 10. In this case, the selector 19 selects the input from the output line (i.e., selects a clock signal) and sends the selected input to the register 16. Then, the control device 14 (the state machine 15) performs operations according to the clock signal input to the register 16.

In the first state, upon receiving a timeout notification signal from the timer 40, the control device 14 (the state machine 15) sends a switching signal, which instructs the selector 19 to select the signal to be sent to the input data line 17, and requests the electrical power controller 22 to stop the supply of electrical power to at least the clock signal generator 13 and the register 11. Upon receiving the request, the electrical power controller 22 controls to stop the supply of electrical power to at least the clock signal generator 13 and the register 11. In this example, of a plurality of constituent elements of the communication device 10, the electrical power controller 22 stops the supply of electrical power to the elements other than the control device 14. As a result, the state of the communication device 10 is switched to the second state representing the power saving mode.

Figure 4:
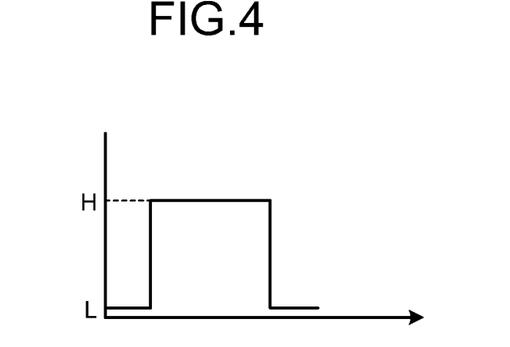
FIG. 4 is a diagram illustrating an exemplary waveform of an activation signal according to the embodiment.

In the second state, to the input data line 17 is sent a wake-up signal, which is used in switching the communication device 10 to the first state, from the external device 24. When the activation signal is input to the register 16 via the selector 19, the control device 14 (the state machine 15) controls to switch the state of the communication device 10 to the first state. Herein, the activation signal is a pulsed signal (a square-wave signal) that is defined in advance using the protocol between the external device 24 and the information processing device 21. FIG. 4 is a diagram illustrating an exemplary waveform of the activation signal that is sent to the input data line 17. In the example illustrated in FIG. 4, the period of time for which the signals sent to the input data line 17 are maintained a at a high level represents the period of time for which the activation signal is sent. Herein, in the second state, the change in the signals, which are sent to the input data line 17, from a low level ("0") to the high level ("1") is used as the rising of the clock signal.

In the embodiment, in the second state, when the activation signal from the external device 24 is input to the register 16, the control device 14 (the state machine 15) sends a switching signal, which instructs the selector 19 to select a clock signal, and requests the electrical power controller 22 to resume the supply of electrical power to the clock signal generator 13 and the register 11. In this example, the control device 14 requests the electrical power controller 22 to resume the supply of electrical power to the constituent elements at least related to data reception (i.e., the constituent elements other than the control device 14 such as the register 11, the clock signal generator 13, and the BUS I/F 31) from among a plurality of constituent elements of the communication device 10. Upon receiving the request, the electrical power controller 22 controls to resume the supply of electrical power to at least the constituent elements related to data reception. As a result, the communication device 10 switches to the first state in which data can be received from the external device 24.

Moreover, the control device 14 (the state machine 15) sends, to the clock signal generator 13, a CLK enable signal that enables the functions of the clock signal generator 13. The clock signal generator 13, to which the supply of electrical power has been resumed by the electrical power controller 22, receives the CLK enable signal from the control device 14 (the state machine 15) and resumes to generate clock signals. Moreover, according to the switching signal received from the control device 14 (the state machine 15), the selector 19 selects the input (a clock signal) from the output line and sends it to the register 16. Then, the control device 14 (the state machine 15) performs operations according to the clock signal input to the register 16.

Figure 5:
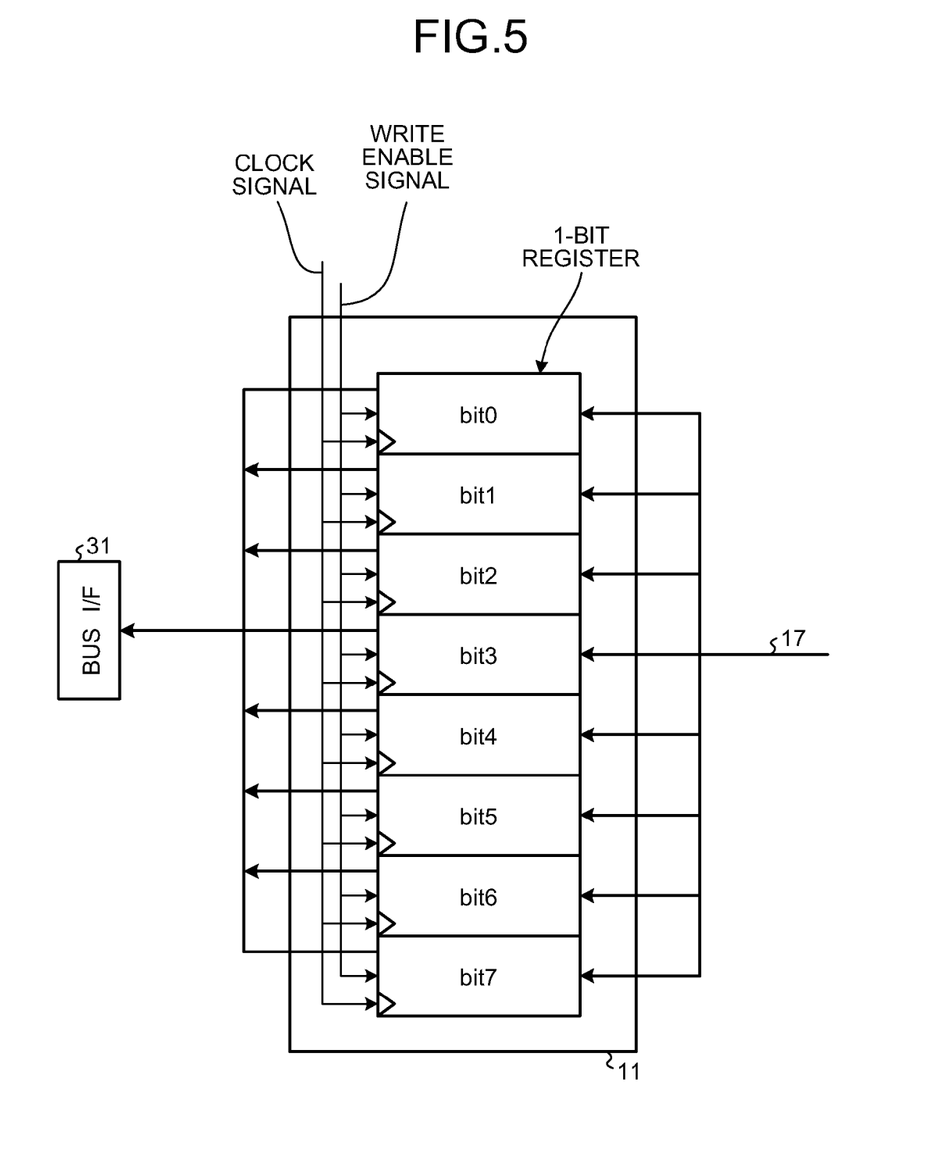
FIG. 5 is a diagram for explaining an exemplary data obtaining method according to the embodiment.

Explained below with reference to FIG. 5 is an exemplary method of obtaining the data present in the input data line 17. In the case of 8-bit data communication that is the common mode of communication, the data to be communicated consists of a 1-bit signal for notifying the presence or absence of data (i.e., notifying the start of data); 8-bit data portion; and a 1-bit signal indicating the end of data.

As described earlier, in this example, in the first state, when the condition that data is not sent to the input data line 17 continues for a certain period of time, the control device 14 (the state machine 15) switches the state of the communication device 10 to the second state and waits for the input of an activation signal from the external device 24. Once the input of an activation signal is detected, the control device 14 (the state machine 15) controls to switch the state of the communication device 10 to the first state and waits for data acquisition (in the following explanation, this state is sometimes called a "data acquisition wait state"). Usually, in data communication, the period of time taken for communicating 1-bit data is decided. Hence, the value sent during each such period of time to the input data line 17 is sequentially stored in 1-bit register corresponding to bit0 (or bit7). Herein, whether the values are to be stored from bit0 or from bit7 is determined in advance among the devices that send and receive data.

In the data acquisition wait state, which means the waiting for a period of time calculated from the clock frequency and the communication speed (i.e., the speed indicating the number of transmission bits per second), the state is toggled to a data acquisition state in which the data is obtained. Then, the control device 14 (the state machine 15) controls to import (latch) the data, which is present in the input data line 17, into a 1-bit register. For example, in the case of importing the data into the register corresponding to bit0, the control device 14 (the state machine 15) sends a write enable signal to the register corresponding to bit0. Upon receiving the write enable signal, the register corresponding to bit0 imports the data present in the input data line 17 according to the clock signal. In this way, until the number of pieces of imported data equals the determined number of pieces of data, the data acquisition wait state and the data acquisition state are toggled. When the signal indicating the end of data is received, it marks the end of data reception. In FIG. 5 is illustrated an example in which 8-bit data is obtained (received) and is then sent to the BUS I/F 31.

Figure 6:
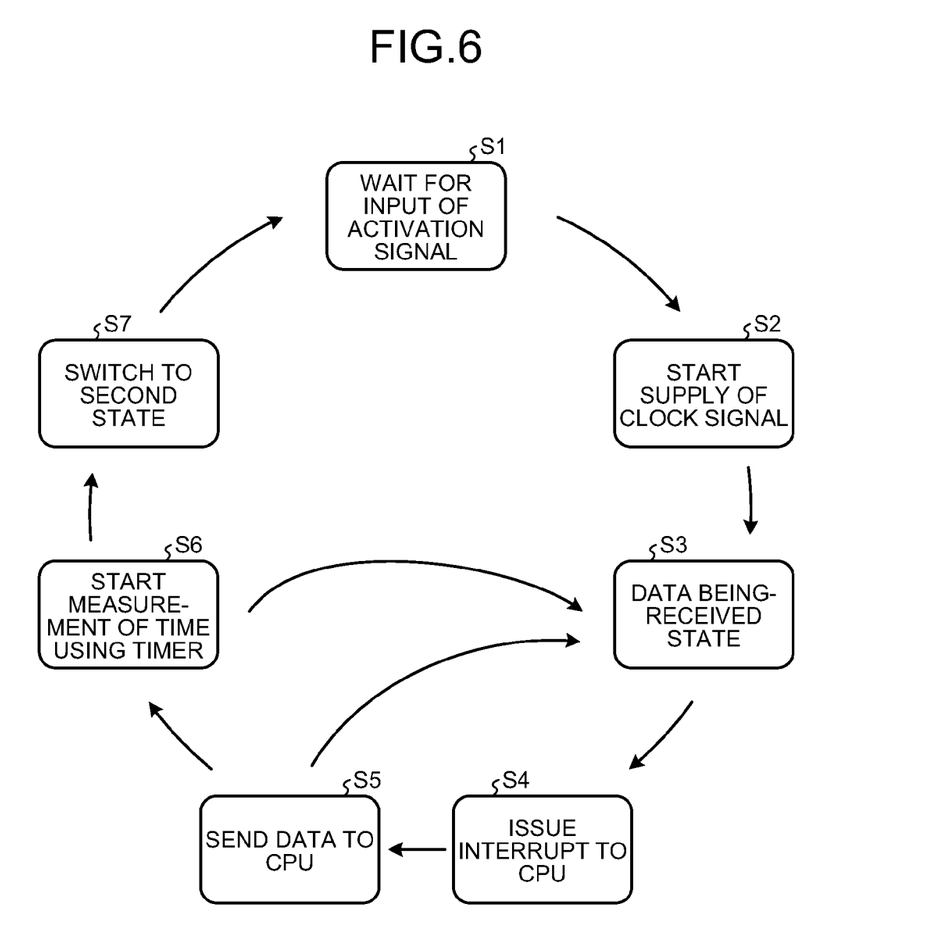
FIG. 6 is a conceptual diagram illustrating the operations performed by a state machine according to the embodiment.

FIG. 6 is a diagram illustrating, in a conceptual manner, the operations performed by the state machine 15. As described previously, in the first state, when the condition that data is not sent to the input data line 17 continues for a certain period of time, the state machine 15 switches the state of the communication device 10 to the second state. Then, the state machine 15 waits for the input of an wake-up signal (Step S1).

The external device 24 sends a wake-up signal to the input data line 17 with the aim of switching the state of the communication device 10 to the first state, in which data can be received, before sending data to the communication device 10. This wake-up signal is input to the register 16 via the selector 19. Once the wake-up signal is input to the register 16, the state machine 15 sends a switching signal, which instructs the selector 19 to select a clock signal, and requests the electrical power controller 22 to resume the supply of electrical power to the clock signal generator 13 and the register 11. Moreover, the state machine 15 sends, to the clock signal generator 13, a CLK enable signal that enables the functions of the clock signal generator 13. As a result, the clock signal generator 13 starts supplying a clock signal (Step S2), and inputs the clock signal to the register 16 via the selector 19.

Then, the state machine 15 sets a condition for issuing an interrupt to the CPU 30; switches to the data acquisition wait state; and, as described earlier, repeatedly switches between the data acquisition wait state and the data acquisition state so as to receive the data (Step S3; in the following explanation, sometimes called a "data being-received state"). Subsequently, when there occurs an interrupt with respect to the CPU 30 (Step S4), the state machine 15 controls to send the received data to the CPU 30 via the BUS I/F 31 (Step S5). Meanwhile, after the occurrence of the interrupt with respect to the CPU 30, if other data is to be received, then the state machine 15 returns to the data being-received state and receives data.

When the data transfer from the external device 24 is over, no data and no valid signal is sent to the input data line 17. As described earlier, the timer 40 starts measuring time from the timing at which the last piece of data was sent to the input data line 17 (Step S6). If the data is sent within a certain period of time, then the state machine 15 receives the data (Step S3). However, if data is not sent within a certain period of time (i.e., if a timeout notification signal is received from the timer 40), then the state machine 15 controls to change the state of the communication device 10 to the second state (Step S7). As described earlier, upon receiving a timeout notification signal from the timer 40, the state machine 15 sends a switching signal, which instructs the selector 19 to select the signal to be sent to the input data line 17, and requests the electrical power controller 22 to stop the supply of electrical power to at least the clock signal generator 13 and the register 11. Upon receiving the request, the electrical power controller 22 controls to stop the supply of electrical power to at least the clock signal generator 13 and the register 11. As a result, the state of the communication device 10 is switched to the second state representing the power saving mode.

Meanwhile, the configuration can be such that the timer 40 is either included in the communication device 10 or not included in the communication device 10 but is activated by the CPU 30.

As described above, in the embodiment, in the first state representing the state in which the communication device 10 is able to receive data, when the condition that data is not sent to the input data line 17 continues for a certain period of time, the control device 14 (the state machine 15) controls to switch the state of the communication device 10 to the second state in which power consumption is less than in the first state. As a result, it becomes possible to reduce the power consumption of the functions related to data reception.

Figure 7:
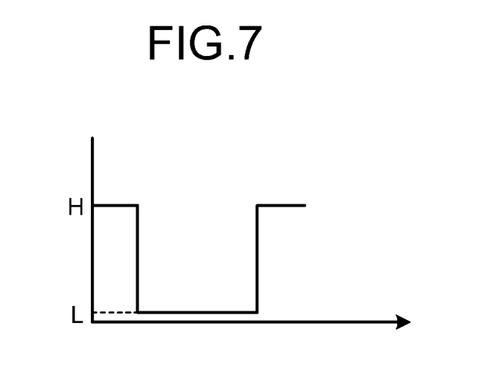
FIG. 7 is a diagram illustrating an exemplary waveform of an activation signal according to a modification example.
Figure 8:
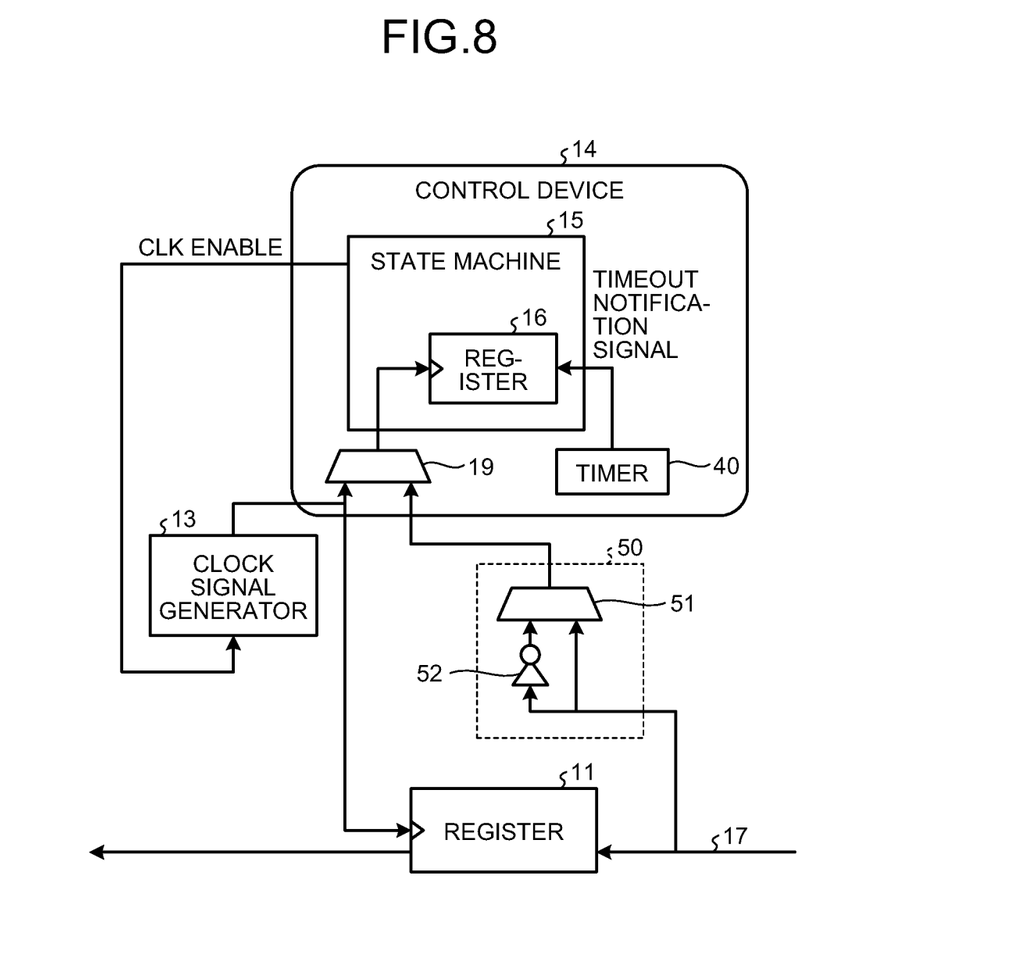
FIG. 8 is a diagram for explaining a polarity converter according to a modification example.

In the embodiment, in the second state, the change in the signals, which are sent to the input data line 17, from the low level to the high level is used as the rising of the clock signal. However, for example, as illustrated in FIG. 7, consider a case in which the period of time for which the signals sent to the input data line 17 are maintained at the low level represents the period of time for the wake-up signal is sent, that is, consider a case in which the change in the signals, which are sent to the input data line 17, from the high level to the low level need to be detected as the rising of the clock signal. In that case, as illustrated in FIG. 8, a polarity converter 50 can be disposed at that input of the selector 19 which is on the side the input data line 17. In the example illustrated in FIG. 8, the polarity converter 50 includes a selector 51 for polarity selection that receives input of the signals sent to the input data line 17 and receives input of signals obtained by a NOT element 52 by inverting the signals sent to the input data line 17.

In the example illustrated in FIG. 8, in the case in which the wake-up signal has the waveform illustrated in FIG. 4, the selector 51 for polarity selection selects the signals sent to the input data line 17 and sends those signals to the selector 19. However, in the case in which the wake-up signal has the waveform illustrated in FIG. 7, the selector 51 for polarity selection selects the signals obtained by the NOT element (such as an inverter) 52 by inverting the signals sent to the input data line 17, and sends the inverted signals to the selector 19. Thus, in essence, the polarity converter 50 converts the polarity of the wake-up signal, which is sent to the input data line 17, into the polarity that is detectable by the control device 14 (the state machine 15) as a clock signal; and sends the post-conversion wake-up signal to the selector 19.

Meanwhile, in the embodiment, the clock signal generator 13 is disposed inside the communication device 10 (the receiver 2). However, that is not the only possible case. Alternatively, for example, in the case in which the clock signal generator 13 is required to have a high accuracy, the configuration can be such that a crystal oscillator installed on the outside of the information processing device 21 can be used and clock signals can be controlled on the outside of the communication device 10 in such a way that they are sent when required by the communication device 10.

Meanwhile, in the embodiment, the communication device 10 can be considered to be corresponding to a "communication device" mentioned in claims. However, alternatively, for example, the information processing device 21 that includes the communication device 10 can also be considered to be corresponding to the "communication device" mentioned in claims. Still alternatively, the receiver 2 included in the communication device 10 can also be considered to be corresponding to the "communication device" mentioned in claims.

Meanwhile, regarding the communication between the external device 24 and the information processing device 21, instead of using a serial communication interface, it is also possible to use a parallel interface that is bidirectional in nature with data signals of two bits or more. That is, the communication between the external device 24 and the information processing device 21 can be done using a data communication line of two bits or more, and the input data line 17 represents one bit of the data communication line of two bits or more. Thus, of the data communication line of two bits or more, the use of one bit enables implementation of the input data line 17. In this case, if any one signal line of a plurality of signal lines (communication signal lines) is defined to send the wake-up signal and if that signal line is used as the input data line 17; then, even in the case of using a parallel interface, the power consumption taking place while waiting for data reception can be reduced in an identical manner to the serial interface according to the embodiment. In essence, as long as the configuration is such that the communication device 10 includes a plurality of communication signal lines including the input data line 17, it serves the purpose.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   a register to receive data via an input data line; and
   a selector to select either a signal in the input data line or a synchronization signal from a synchronization signal generator, wherein
   the communication device
   in a first state in which the selector selects the synchronization signal, when a condition in which data is not sent to the input data line continues for a certain period of time, controls the selector to select the signal in the input data line, controls an electrical power controller, which controls supply of electrical power to the communication device, to stop the supply of the electrical power to the synchronization signal generator and the register, and switches the first state of the communication device to a second state; and
   in the second state, when a wake-up signal from the input data line is sent via the selector, controls the selector to select the synchronization signal, controls the electrical power controller to resume the supply of the electrical power to the synchronization signal generator and the register, and switches the second state of the communication device to the first state.

2. The device according to claim 1, wherein the input data line is a single bit of a data communication line of two bits or more.

3. The device according to claim 1, wherein power consumption in the second state is less than power consumption in the first state.

4. The device according to claim 1, wherein
   the wake-up signal is a pulsed signal; and
   a controller uses change in rising edge of the wake-up signal as rising edge of the synchronization signal.

5. A communication device comprising:
   a register to receive data via an input data line;
   a timer to measure a period of time for which data is not sent to the input data line; and
   a selector to select either a signal in an input data line or a synchronization signal from a synchronization signal generator, wherein
   the communication device
   in a first state in which the selector selects the synchronization signal, when, from a measurement result of the timer, a condition in which the data is not sent to the input data line continues for a certain period of time, controls the selector to select the signal in the input data line, controls an electrical power controller, which controls supply of electrical power to the communication device, to stop the supply of the electrical power to the synchronization signal generator and the register, and switches the first state of the communication device to a second state; and in the second state, when a wake-up signal from the input data line is sent via the selector, controls the selector to select the synchronization signal, controls the electrical power controller to resume the supply of the electrical power to the synchronization signal generator and the register, and switches the second state of the communication device to the first state.

6. The device according to claim 5, wherein the input data line is a single bit of a data communication line of two bits or more.

7. The device according to claim 5, wherein power consumption in the second state is less than power consumption in the first state.

8. The device according to claim 5, wherein
the wake-up signal is a pulsed signal; and
a controller uses change in rising of the wake-up signal as rising of the synchronization signal.

9. A communication device comprising:
a register to receive data via an input data line;
a synchronization signal generator to supply a synchronization signal; and
a selector to select either a signal in the input data line or the synchronization signal, wherein in a first state in which the selector selects the synchronization signal, when a condition in which data is not sent to the input data line continues for a certain period of time, controls the selector to select the signal in the input data line, controls an electrical power controller, which controls supply of electrical power to the communication device, to stop the supply of the electrical power to the synchronization signal generator and the register, and switches the first state of the communication device to a second state;

in the second state in which supply of electrical power to the synchronization signal generator is stopped, when a wake-up signal from the input data line is sent via the selector, the communication device controls the selector to select the synchronization signal, controls an electrical power controller to resume the supply of the electrical power to the synchronization signal generator and the register, and switches the second state of the communication device to the first state capable of receiving the data from a device external to the communication device; and the wake-up signal is sent via the same input data line via which the data is received from the device external to the communication device in the first state.

10. The device according to claim 9, further comprising
a register for receiving the data that is input from the device external to the communication device via the input data line.

* * * * *